Dec. 24, 1946.  W. P. MASON  2,413,026
CATHODE RAY INDICATING DEVICE
Filed March 31, 1943  7 Sheets-Sheet 1

INVENTOR
W. P. MASON
BY
ATTORNEY

Dec. 24, 1946.   W. P. MASON   2,413,026
CATHODE RAY INDICATING DEVICE
Filed March 31, 1943   7 Sheets-Sheet 5

ANGLE FREQUENCY CURVE FOR SUPERSONIC PRISM

INVENTOR
W. P. MASON
BY
ATTORNEY

Dec. 24, 1946. W. P. MASON 2,413,026
CATHODE RAY INDICATING DEVICE
Filed March 31, 1943 7 Sheets-Sheet 6

INVENTOR
W. P. MASON
BY
ATTORNEY

Dec. 24, 1946. W. P. MASON 2,413,026
CATHODE RAY INDICATING DEVICE
Filed March 31, 1943 7 Sheets-Sheet 7

INVENTOR
W. P. MASON
BY
ATTORNEY

Patented Dec. 24, 1946

2,413,026

UNITED STATES PATENT OFFICE 2,413,026

CATHODE-RAY INDICATING DEVICE

Warren P. Mason, West Orange, N. J., assignor to Bell Telephone Laboratories, Incorporated, New York, N. Y., a corporation of New York Application March 31, 1943, Serial No. 481,214

3 Claims. (Cl. 315—23)

This invention relates to locating devices and particularly to electrical means for detecting and charting the position of a disturbance in the sea, such as that caused by the propeller of a ship either on the surface or submerged.

The object of the invention is to provide a full automatic system for disclosing the location of one or more ships or other disturbing means. The invention consists essentially in the combination of a detecting means of known design and method of operation with a cathode ray tube of novel design and responsive to the said detecting means for giving a constant visual indication of the position of a ship or other cause of disturbance or generator of compressional waves within a given band of frequencies.

In accordance with the present invention a triangular prism, fully disclosed in my copending application Serial No. 477,916, filed March 4, 1943, is employed as a detecting means. Such a device in general consists of three straight line arrays of piezoelectric crystals each connected in an electrical network whereby a prismatic effect is secured. Such prismatic effect is explained in detail in my copending applications one entitled "Pipe antennas and prisms," Serial No. 381,236, filed March 1, 1941, and another entitled "Prismatic and high power compressional wave radiators and receivers," Serial No. 431,558, filed February 19, 1942. Given a source of a wide band of frequencies such as are set up by the propeller of a ship any one linear array of crystals so connected will detect a particular frequency in accordance with the angle of approach so that the frequency detected becomes a measure of such angle of approach. Each such crystal array will, therefore, define a plane surface including a line between the detecting device and the source of disturbance. Any two such crystal arrays will, therefore, define two intersecting planes having one line in common, the said line from the detecting device and the source of disturbance and such a line will define the azimuth and colatitude angles of the disturbance with respect to the position of the said detecting device.

Heretofore the readings of such a detecting device have been used for calculating the position of a disturbance or have been employed for setting a manually operated geometrical instrument as in my copending application, Serial No. 479,886, filed March 20, 1943. In accordance with the present invention, the output of the detecting device is used to operate a cathode ray tube of special design so that the angles measured will appear as a visual indication, thus avoiding the manual operation of an indicating device. It will, therefore, appear that besides speed in locating a source of disturbance, surety and dependability are also gained by the direct control which the detecting device has over the indicator.

Further, in accordance with the present invention, the devices and the system disclosed herein are capable of simultaneously locating two or more sources of disturbance so that the pursuit of an enemy ship may be watched.

A feature of the invention is a cathode ray tube having an arrangement of deflecting plates, whereby three intersecting traces may be simultaneously depicted to define at their point of intersection the azimuth and colatitude angles of a source of disturbance as reported by a correspondingly arranged triangular prism. From a geographical standpoint a set of deflecting plates is provided for each leg of the triangular prism and arranged in a position normal to the longitudinal direction thereof whereby the trace depicted through the use of such deflecting plates represents the intersection of a plane with the target of the tube parallel in space to the plane defined at the crystal array by one line normal to the longitudinal axis of the crystal array and another line representing the angle of approach of the detected compressional wave.

Another feature of the invention is a combination of a triangular prism and a cathode ray tube responsive thereto in a circuit arrangement whereby the location of a plurality of detected disturbances may be simultaneously depicted.

Other features will appear hereinafter.

The drawings consist of seven sheets having thirteen figures, as follows.

By way of definition, a prismatic device, for other than light energy waves, should be understood to be a device which in transmitting a wave comprising energy of numerous frequencies within a particular frequency spectrum will spread the frequency spectrum by impacting a direction, differing for each frequency, to the several frequencies of the spectrum or which in receiving energy will respond to the several frequencies only when they approach the device at particular respective angles, differing for each frequency.

A prism, then, is a device which may be used either as a projector or a receiver. When used as a projector it will project different frequencies in different directions. Each single frequency is projected in a given direction so that if a signal is to be sent in any particular direction the prism is energized by the corresponding particular frequency. If a signal is to be broadcast throughout the range of the device, then a broad band of frequencies is supplied thereto whereupon the device will separate the frequencies into a spectrum and send each frequency in its own particular direction. When used as a receiver the device will pick up a particular frequency only if the angle of approach corresponds thereto. If the incoming signal is a broad band of frequencies, then the device will respond to only a single one of said frequencies and that one will correspond exactly to the angle of approach, so that the response of the device by reporting a particular frequency received will by the same token report the direction from which the signal is coming. A triangular prism or a triangular electrical frequency prism hereinafter mentioned is a device having three such prisms arranged so that their longitudinal axes form a triangle. In its preferred form such prisms are arranged along an equilateral triangle and in this application it is assumed that such a triangular prism is used, although it will be apparent that other formations could be used in which case the physical construction of the deflecting plates of the present cathode ray tube would have to be altered in conformity therewith.

Figure 1:
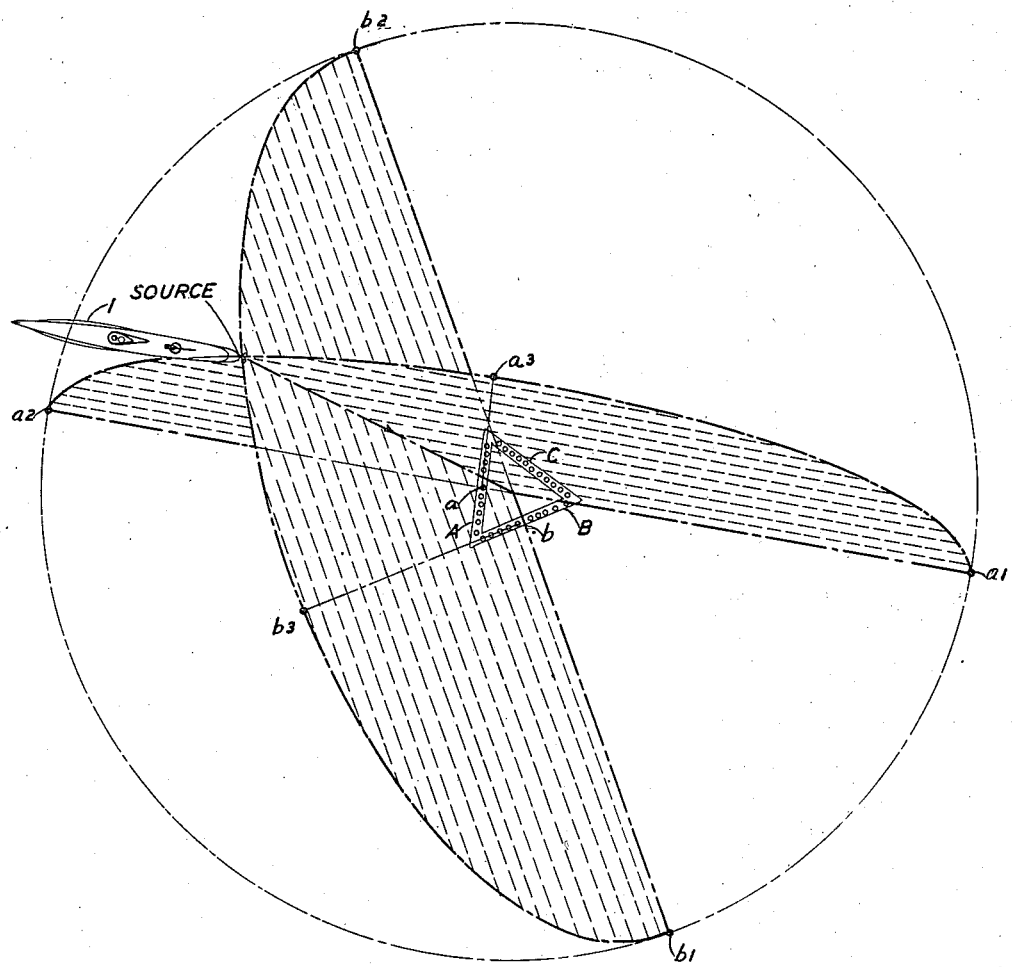
Fig. 1 is a geometrical diagram, being a plan of the intersection of two planes which are indicated in perspective and showing the line formed by the intersection thereof running from a detecting instrument to a source of disturbance.

In Fig. 1 a vessel 1 is shown whose propeller is a source of disturbance. Located at some distance therefrom is a triangular prism having the three legs A, B and C. This prism will be located in a horizontal position on the bed of the sea and the vessel will be located above it, either on the surface of the sea or submerged. The problem is to determine the azimuth and colatitude angles of the line extending from the theoretical center of the triangular prism to the source of disturbance and this may be done by calculating the intersection of at least two planes experimentally fixed by the electrical response of the different legs of the prism.

For purposes of illustration, the center of the prism is used as a center point of a hemisphere, somewhere in whose surface lies the source of disturbance. The circle shown by the dot and dash line is the horizontal trace of the hemisphere in whose plane the triangular prism is located. Two planes, one determined by the leg A and the one determined by the leg B are defined each by a diameter of the said circle and by the great circle trace of the plane as it cuts the hemispherical surface. The plane determined by the leg A is shown by the shaded surface within the area defined by the horizontal surface straight line $a2$, $a$, $a1$, which is normal to the longitudinal axis of the leg A, and the great circle trace $a2$, $a3$, $a1$, which passes through the source of disturbance. Likewise, the plane determined by the leg B is shown by the shaded surface within the area defined by the horizontal surface straight line $b2$, $b$, $b1$, which is normal to the longitudinal axis of the leg B, and the great circle trace $b2$, $b3$, $b1$, which also passes through the source of disturbance. The intersection of these two planes is a straight line extending from the source of disturbance to the center of the prism.

Figure 2:
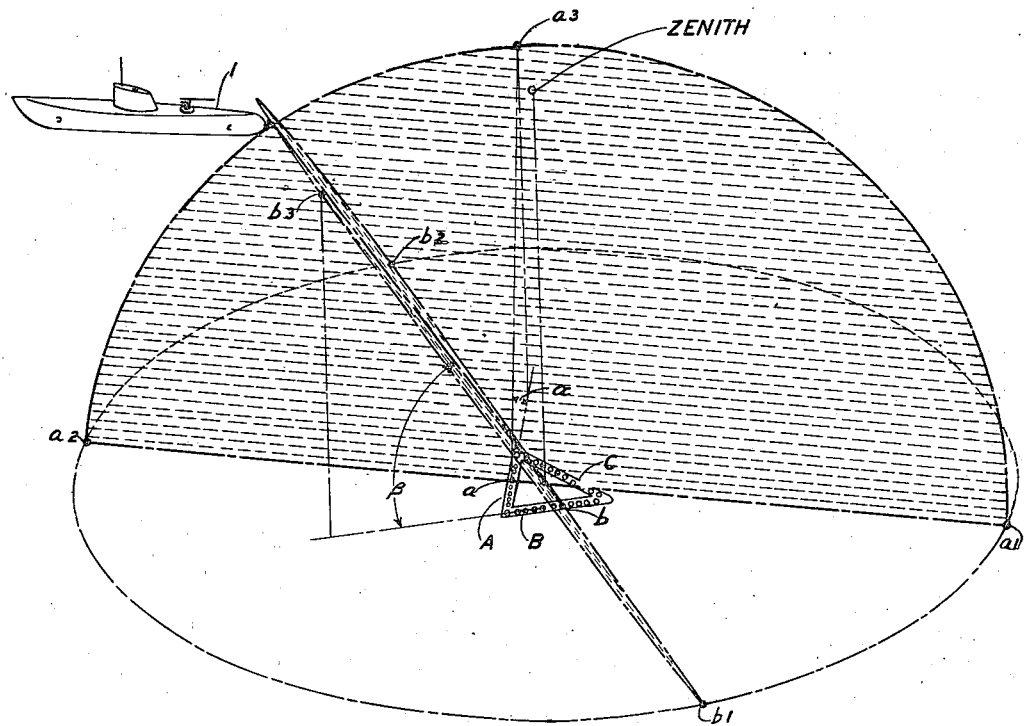
Fig. 2 is a perspective view of the same.

The plane determined by the leg A may be said to be determined by two straight lines, one the line $a2$, $a$, $a1$, lying in a horizontal plane and at right angles to the longitudinal axis of the leg A, and another $a$, $a3$, at right angles to the first line but at a measurable angle to the horizontal plane. This is known as the angle of approach and is that angle which the leg A will measure in accordance with the principles set forth in my copending applications, heretofore mentioned. This angle, shown as angle $\alpha$ may be visualized more clearly in the perspective of Fig. 2. The corresponding angle $\beta$ defining the plane determined by the leg B may be even more clearly seen in Fig. 2.

Thus by electrical measurements of the frequency of the incoming waves from the source of disturbance the angles $\alpha$ and $\beta$ may be determined and these determine the planes whose intersection is the straight line between the center of the triangular prism and the source of disturbance.

A third angle $\lambda$ may be determined by the leg C and may be used as a check. Practically the three angles are all measured and those two which are closest to 90 degrees are selected for use since the greatest accuracy is attained when the incoming wave is in a plane normal to the longitudinal axis of the prism. The three angles having been determined the azimuth and colatitude angles of the source of disturbance can be calculated or it may be visualized by a geometrical instrument in accordance with my copending application hereinbefore mentioned.

Figure 3:
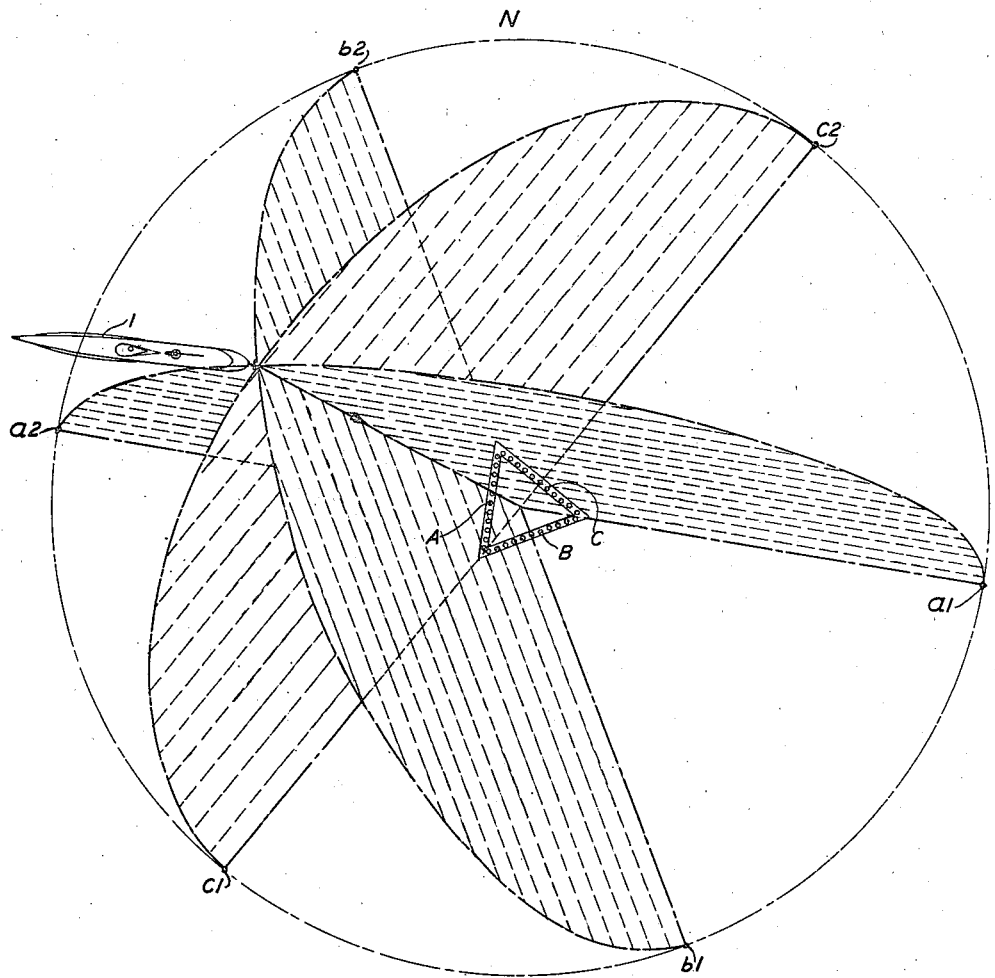
Fig. 3 is a view similar to that of Fig. 1, showing the three planes determined by the three legs of the triangular prism and indicating how they would intersect in a single point on the surface of a hemisphere generated about the triangular prism as a center.

Fig. 3 is a view showing the three planes determined by the three angles measured experimentally.

Now in order to avoid time consuming experimental measurements and somewhat complicated calculation applicant herein discloses a cathode ray tube which may be connected to the triangular prism and which will immediately give a precise indication of the location of a source of disturbance by means of three corresponding and intersecting traces of light on the surface thereof.

Figure 4:
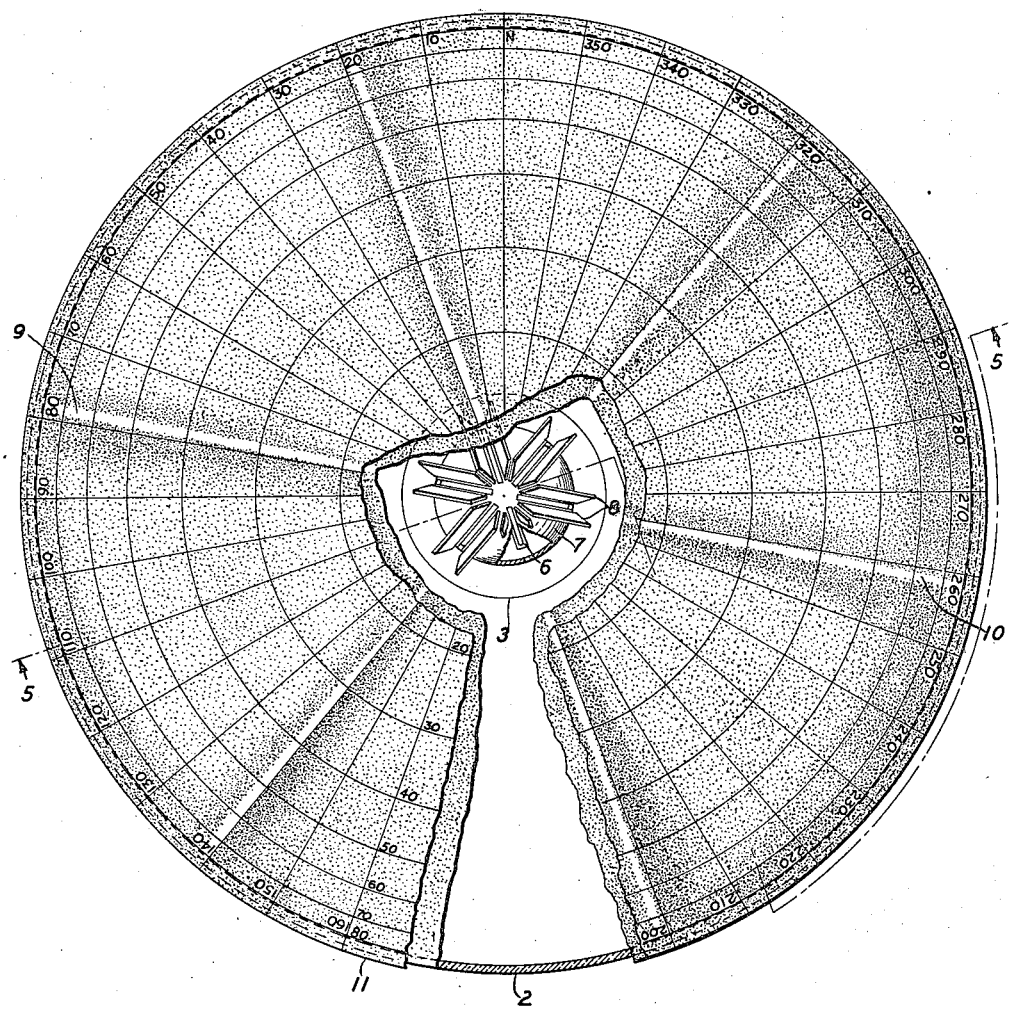
Fig. 4 is a plan view of the cathode ray tube of the present invention showing parts of the upper surface broken away to give a better view of the electrode structure.
Figure 5:
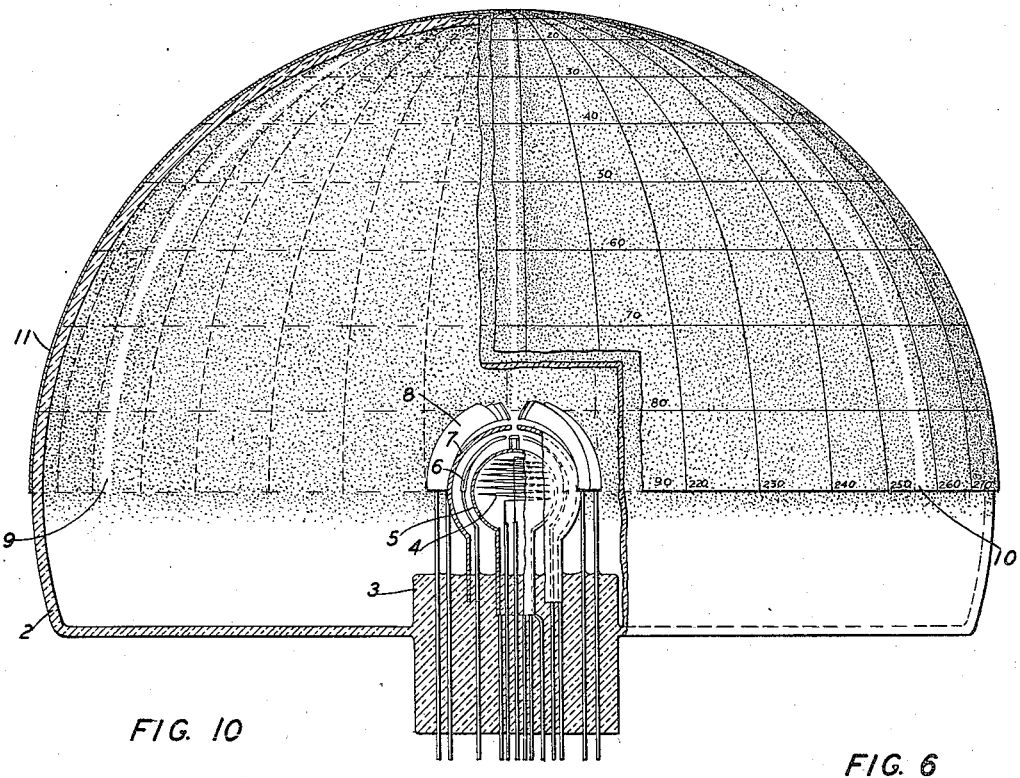
Fig. 5 is a side view of the same.

The tube consists of an envelope 2 substantially in the form of a hemisphere with a press 3 supporting the various controlling elements. There is a heater element 4 for heating the cathode 5 substantially spherical in shape and centered about the center of the hemispherical envelope 2. There is next a grid 6 in the form of a hairpin loop and then an accelerating anode 7 followed by the deflecting plates 8. As will be more clearly seen in Fig. 4 these elements are so disposed as to produce on the viewing screen of the envelope 2 three lines corresponding in direction to lines normal to the longitudinal axes of the three legs of the triangular prism. Due to physical limitations the deflecting plates 8 cannot be made fully semicircular but have to be broken into segments as clearly shown in Fig. 5. The auxiliary anode 7 is roughly hemispherical in shape with openings between spherical triangular segments forming slits to allow free passage of the ionic streams from the cathode.

Figure 11:
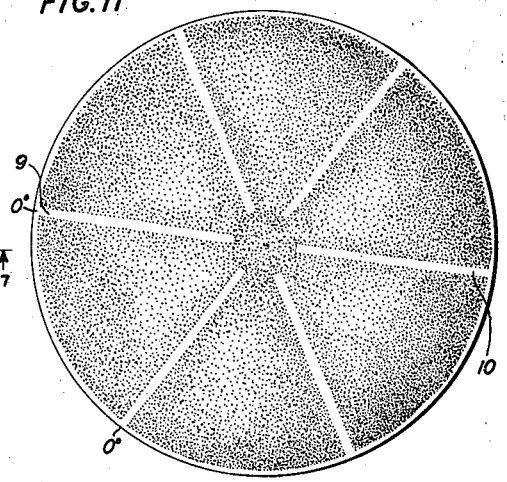
Fig. 11 shows the view of the tube when the source of disturbance with respect to the triangular prism is in line with the zenith.

In effect the action of the tube is to form three planes of electron streams corresponding to the three planes depicted in Fig. 3 but differing slightly therefrom in that the light traces found on the viewing screen are not great circle traces but appear, when viewed from the zenith as straight lines. Due to the physical limitations in the construction of the grids, anodes and the deflecting plates of this tube the trace caused by the response of each leg will appear as a line broken at the center, as the traces 9 and 10 for example in Fig. 11, where these two traces are caused by the leg A. Fig. 11 depicts the appearance of the tube when the deflecting plates are so energized that the cathode emission is not deflected from its normal path.

Figure 6:
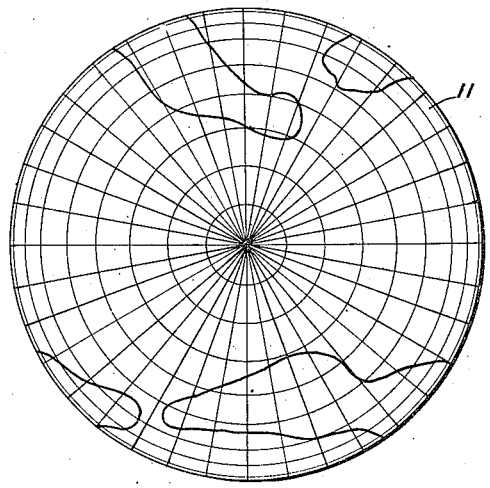
Fig. 6 is a plan view of the transparent or translucent cap which may be placed over the hemispherical surface of the tube and on which a map may be inscribed with lines representing azimuth and colatitude angles.

While it is entirely possible to orient the tube so that the traces 9 and 10 will physically indicate a line normal to the leg A, this is not necessary since a cap 11, of transparent or translucent material with a map of the location in which the triangular prism is used may be slipped over the hemispherical surface of the tube. It will be understood that through calibration after the triangular prism has been set in place such a local map may be drawn on the cap 11 whereby the exact location of any vessel on the surface above is given. For submarines or submerged sources of disturbance the approximate location is given since the direction is definitely indicated. Thus by activating the tube by a source of ultrasonic waves at a known location this cap may be adjusted so that proper indications are given. Fig. 6 is a view, from the zenith, of such a map inscribed cap.

Figure 10:
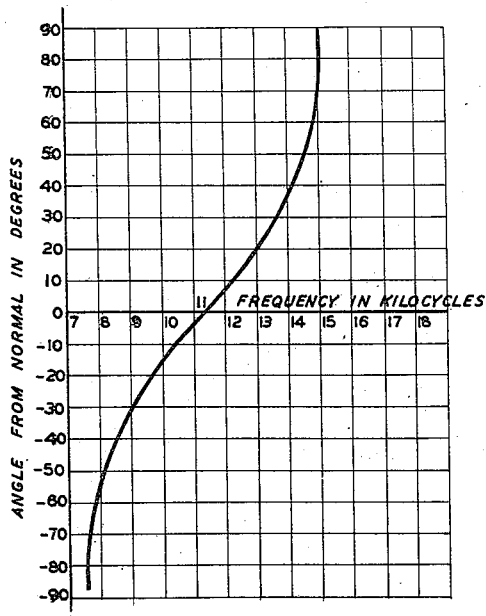
Fig. 10 is a plotted curve showing the characteristic of a prism such as one of which the three legs of the triangular prism are constructed.
Figure 7:
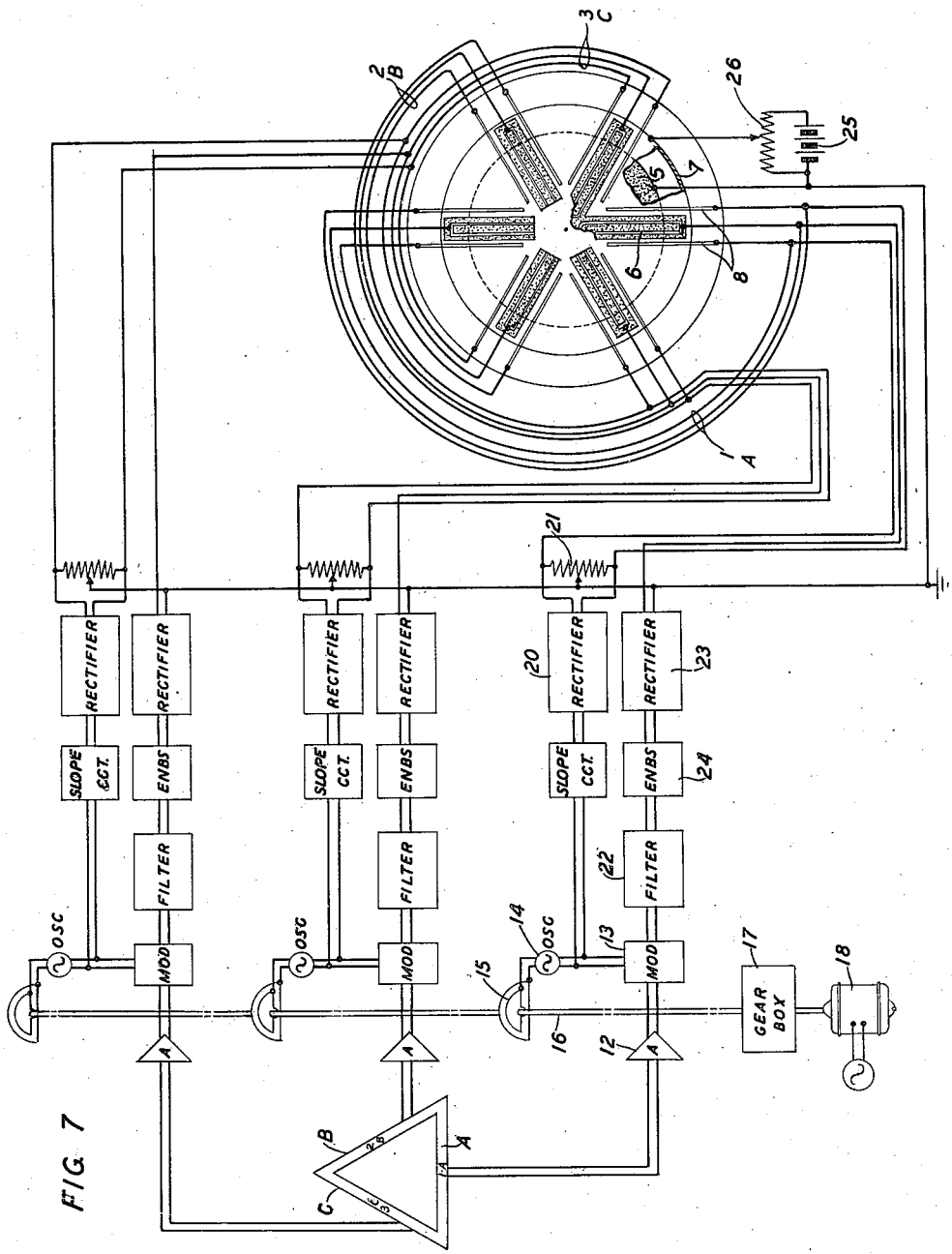
Fig. 7 is a schematic circuit diagram showing how the tube may be connected in a circuit including the triangular prism used as a detector of compressional waves.

The tube may be operated by connection to a triangular prism as indicated by the schematic circuit diagram of Fig. 7. Each of the legs A, B and C of the prism is connected through an amplifier such as 12 to a modulator such as 13. The modulator 13 may be controlled by an oscillator 14 which is continuously varied by a condenser 15 driven by a shaft 16 connected through a gear train 17 to a motor 18. The continuously varying frequency of the oscillator 14 is sent through an equalizer or slope circuit 19 which controls the amount of current sent out as a function of frequency. This current is rectified by the rectifier 20 and supplied with a suitable bias by the potentiometer device 21 so that the position of the trace will be a great circle when the frequency of the oscillator is at a given point. The curve of Fig. 10 is a typical angle frequency curve for a leg of the prism and the bias 21 must be adjusted to make the line represented by the traces 9 and 10 pass through the point representing the zenith when this curve passes through zero. The biased output of the rectifier is supplied to the deflecting plates 8.

The derived frequency from the modulator 13 is passed through a sharply tuned filter 22 and rectified by the rectifier 23. In order to compare the signal response over the noise response it may be desirable to introduce an expansion and noise biasing device 24 between the filter 22 and the rectifier 23. The rectified output is then put on the grid 6 and controls the output of electrons from that slit. An added potential supplied by the battery 25 and potentiometer 26 will supply an accelerating potential to the screen anode 7.

The operation of the device is then as follows: As the oscillator sweeps from one frequency extreme to the other, if there were frequencies coming from the prism the trace could sweep across the whole hemisphere. Since for one source of disturbance there will be a response at only one frequency the cathode ray tube will show only one trace at a definite location. Two prisms will show two traces and the intersection will give the azimuth and colatitude angles of the source of disturbance. Three prisms will give a triple intersection at that point.

Figure 8:
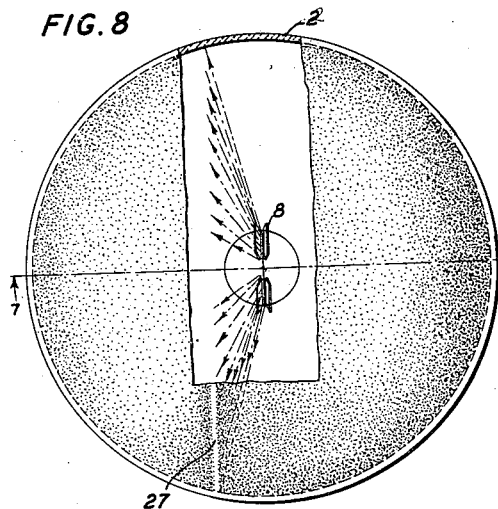
Fig. 8 is a plan view with a portion broken away of the surface of the tube showing how the sheet of electrons are controlled to give an indication which view from the zenith appears to be a straight line.
Figure 9:
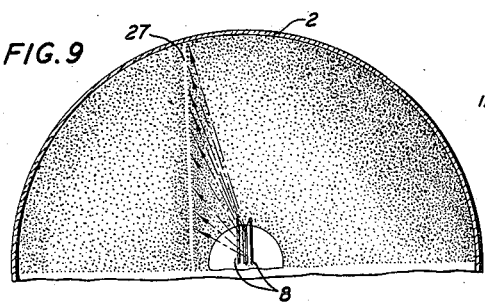
Fig. 9 is a side view of the same.
Figure 12:
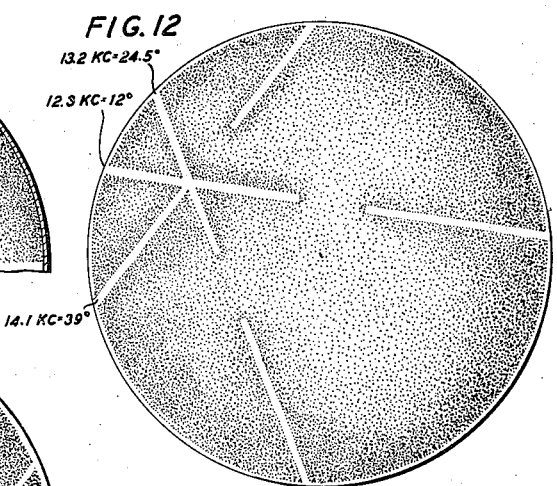
Fig. 12 is a similar view and indicates the appearance when the source of disturbance is in the position indicated in Fig. 3.

Fig. 8 with a portion of the viewing screen or envelope 2 broken away, and Fig. 9, indicate the effect of the deflecting plates 8 in shifting a sheet of emitted electrons to produce the trace 27. Fig. 11 is a view of the screen when a source of disturbance is at the zenith or directly above the triangular prism. Fig. 12 shows the indication that would be received when a source of disturbance is in the position indicated in Figs. 1, 2 and 3.

Figure 13:
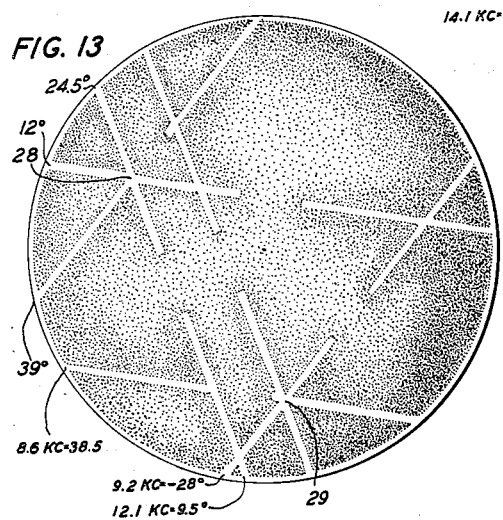
Fig. 13 is a similar view showing the appearance when two sources of disturbance are simultaneously operating the tube.

It will be noted that if there are more than one source of disturbance present, all such sources will be shown by triple intersections. This is illustrated in Fig. 13 where there is a triple intersection at the point 28 and another at the point 29. Through this means one boat pursued by another may be visualized.

What is claimed is:

1. In an indicating system, the combination of a triangular electrical frequency prism and a cathode ray tube responsive thereto, said cathode ray tube having three sets of deflecting plates corresponding in longitudinal spatial direction to the longitudinal axes of said triangular prism, each set of deflecting plates being effectively connected to and controlled by the corresponding prism forming one leg of said triangular prism.

2. In an indicating system, the combination of a triangular electrical frequency prism selectively responsive to different frequency compressional waves and a cathode ray tube responsive thereto, said cathode ray tube having three sets of deflecting plates, each set being effectively connected to and under control of a corresponding leg of said triangular prism.

3. In an indicating system, the combination of a triangular prism adapted to be located in a horizontal plane on the bed of a body of water and selectively responsive to incoming compressional waves, said selective response constituting a differentiation between the frequencies of a wide band of frequencies in accordance with the direction of approach of said compressional waves, and a cathode ray tube responsive thereto, said cathode ray tube having three sets of deflecting plates each set being under control of a corresponding leg of said triangular prism.

WARREN P. MASON.